United States Patent [19]

Shibata et al.

[11] Patent Number: 4,682,245
[45] Date of Patent: Jul. 21, 1987

[54] VIDEO AND AUDIO SIGNAL RECORDING, REPRODUCING AND EDITING APPARATUS WITH REPLACEMENT OF VIEWED LUMINANCE SIGNAL COMPONENT DURING INSERT AUDIO EDITING MODE

[75] Inventors: Masahiro Shibata; Tatsuo Tsujibayashi, both of Tokyo; Hiroyuki Sato, Kanagawa; Yoshinori Machida, Tokyo, all of Japan

[73] Assignee: Sony Corporation, Tokyo, Japan

[21] Appl. No.: 872,861

[22] Filed: Jun. 11, 1986

[30] Foreign Application Priority Data

Jun. 18, 1985 [JP] Japan .................. 60-132639

[51] Int. Cl.⁴ ............... H04N 5/782; H04N 5/91; H04N 9/79
[52] U.S. Cl. .................... 358/311; 358/316; 358/327; 358/343; 360/14.1; 360/19.1
[58] Field of Search .............. 358/310–311, 358/314–319, 327–328, 335–336, 343; 360/14.1, 37.1, 38.1, 19.1

[56] References Cited

U.S. PATENT DOCUMENTS

| 4,209,800 | 6/1980 | Yamamitsu et al. | 358/317 |
| 4,246,615 | 1/1981 | Shiraishi et al. | 360/19.1 X |
| 4,357,628 | 11/1982 | Wharton | 358/317 |
| 4,447,834 | 5/1984 | Sugiyama | 358/310 |
| 4,479,150 | 10/1984 | Ilmer et al. | 358/310 |
| 4,551,771 | 11/1985 | Machida et al. | 360/19.1 |

Primary Examiner—Raymond F. Cardillo
Assistant Examiner—Wayne R. Young
Attorney, Agent, or Firm—Lewis H. Eslinger; Alvin Sinderbrand

[57] ABSTRACT

An apparatus for recording and reproducing a video signal and an audio signal which are recorded in different areas or portions of each slant track on a tape includes first and second rotary heads for recording and reproducing the video and audio signals in alternate tracks, a playback circuit for processsing luminance and chrominance components of the video signal reproduced by the first and second rotary heads when scanning video signal-containing areas of the respective tracks, a circuit for supplying an audio signal to the rotary heads to be recorded, a signal generator for generating a predetermined signal in substitution for the processed luminance component, and a muting circuit for muting the reproduced chrominance component, and wherein the predetermined signal from the signal generator is substituted for the processed luminance component and the chrominance component is muted by the muting circuit during recording of the audio signal in place of a previously recorded audio signal.

7 Claims, 10 Drawing Figures

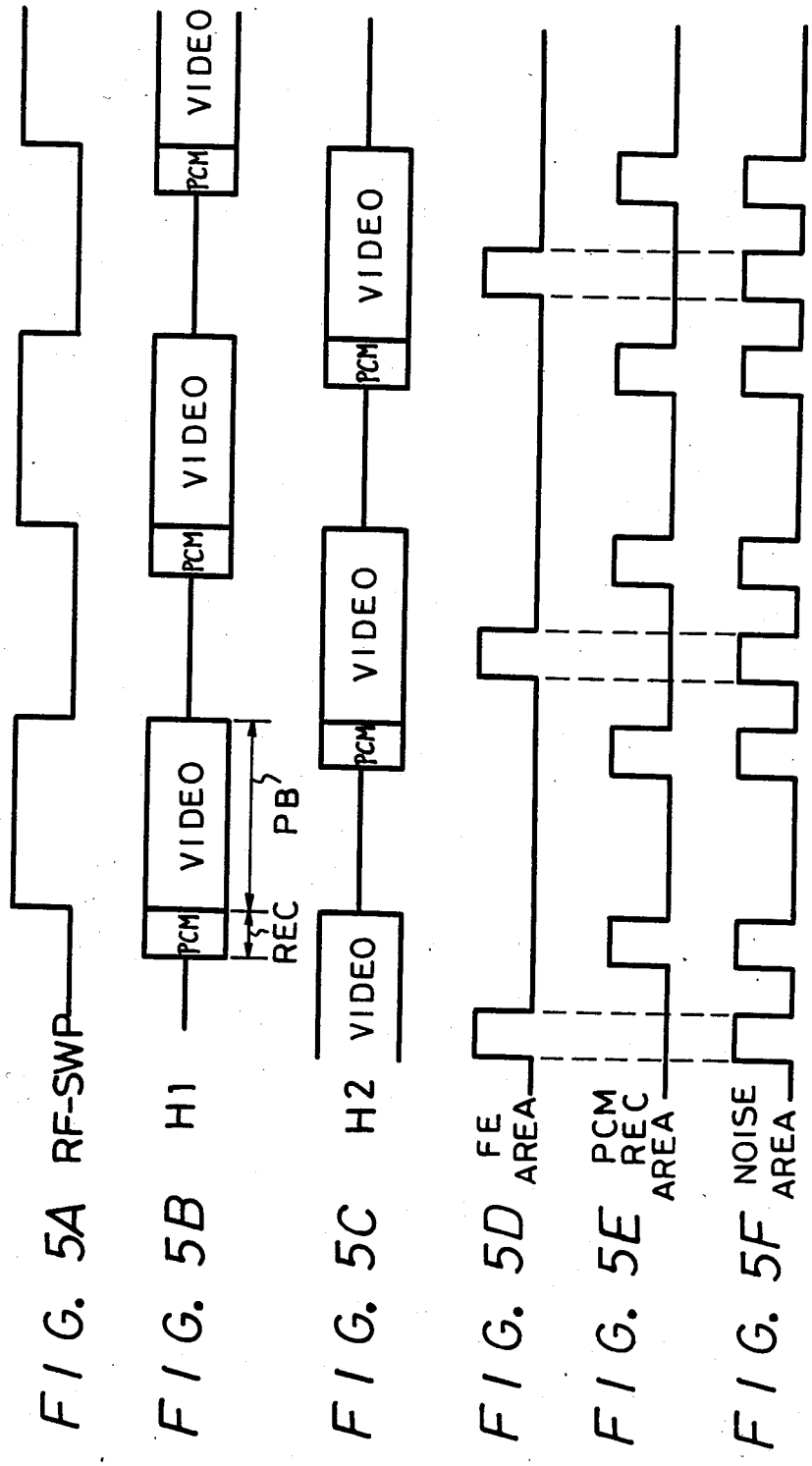

VIDEO AND AUDIO SIGNAL RECORDING, REPRODUCING AND EDITING APPARATUS WITH REPLACEMENT OF VIEWED LUMINANCE SIGNAL COMPONENT DURING INSERT AUDIO EDITING MODE

BACKGROUND OF THE INVENTION

1. Field of the Invention

The present invention relates to an apparatus for recording and reproducing a video signal and an audio signal, and which, for example, is suitable for use in an 8 mm video tap recorder.

2. Description of the Prior Art

Standardization of a so-called 8 mm video tape recorder has been proposed. According to such standardization represented generally in U.S. Pat. No. 4,551,771 having a common assignee herewith, and as shown in FIG. 1 hereof, the recording and/or reproducing of a video signal on and/or from magnetic tape TP is carried out by first and second rotary magnetic heads H1 and H2 which are mounted on a rotary tape guide drum RD at respective locations having an angular spacing of 180° therebetween. The magnetic tape TP is helically wrapped around the periphery of the tape guide drum over an angular range of 221° by guide pins G1 and G2 and is normally transported longitudinally in the direction of the arrow t. In an interval of 180° within the tape wrapping angle of 221°, the video signal is normally recorded on and/or reproduced from the magnetic tape TP by heads H1 and H2 alternately while rotating in the direction of the arrow d. In the remaining interval of 36° within the tape wrapping angle, an audio signal, which is pulse-code-modulated (PCM) and time-base-compressed, is recorded on and/or reproduced from the magnetic tape TP by the same rotary heads H1 and H2.

The azimuth angles of the head gaps of the first and second rotary heads H1 and H2 are made different from each other in a range of ±10°. In the proximity of the second rotary head H2, there is provided an auxiliary rotary magnetic head H3 which is used for playback when the tape speed is other than the standard tape speed for recording. The auxiliary head H3 is desirably spaced apart from the second rotary head H2 in the circumferential direction by a distance corresponding to two horizontal periods on magnetic tape TP. The rotary head H3 is shown to precede the head H2 with reference to the direction of rotation d. The azimuth of the head gap of auxiliary rotary magnetic head H3 is selected to be the same as the azimuth of the head gap of the first rotary magnetic head H1. Further, an erasing rotary magnetic head He is mounted on rotary drum RD at a location spaced angularly by 90° relative to first and second rotary magnetic heads H1 and H2. The gap width of this erasing rotary head He corresponds to the combined width of two slant or skewed recording tracks.

As shown on FIG. 2, a video signal and a PCM (pulse-code-modulated) audio signal are recorded on tape TP in each of a succession of slant or skewed tracks T1,T2,T3, T4, . . . , each having a length corresponding to the wrapping angle of 221°, and which are formed by the first and second rotary heads H1 and H2, alternately. More particularly, in an overscan section or area AP of each of the skewed tracks T1,T2, . . . , having a length corresponding to an angular range of 36° starting from the point where the respective rotary head H1 or H2 starts scanning the track, there is recorded the PCM audio signal corresponding to one field period of the video signal, but with the time base of such audio signal being compressed. In the succeeding area AV of the track having a length corresponding to an angular range of 180°, there is recorded by the head H1 or H2 a color video signal of one field period. Finally, at the trailing end portion or area AV of each track having a length corresponding to an angular range of 5°, there is provided a separating portion SP.

A rotary transformer apparatus (not shown) is employed for transmitting signals to and from rotary heads H1,H2,H3 and He. When a PCM audio signal is recorded in the so-called "after-recording mode", that is, when a new PCM audio signal is recorded in areas AP of skewed tracks on which a PCM audio signal has been previously recorded, the video signal recorded previously in the area AV of one of the skewed tracks is normally reproduced while the area AP is being erased by the erase rotary head He, and then the new PCM audio signal is recorded by the first and second rotary heads H1 and H2. This causes the following problems:

In that phase of the after-recording operation in which the erase rotary head He erases the areas AP of, for example, skewed tracks T1 and T2 in FIG. 2 and the second rotary head H2 simultaneously reproduces the video signal recorded in the area AV of skewed track T2, the erasing signal from the erase rotary head He is mixed directly, or through leakage in the rotary transformer, with the signal reproduced by rotary head H2 over a period corresponding to a 30° rotation angle of the rotary head so that the reproduced synchronizing signal and video signal are disturbed considerably. As a result thereof, and as shown in FIG. 3, a noise bar a, which is a disturbed color picture in the lateral direction, appears in the portion of the reproduced picture slightly above the center thereof and the AFC (automatic frequency control) of the television receiver is disturbed considerably by the deteriorated signal.

Further along in the after-recording operation, while the new PCM audio signal is being sequentially recorded in the areas AP of skewed tracks T1 and T2 by the first and second rotary heads H1 and H2, such new PCM audio signal is mixed into the video signals reproduced by rotary heads H2 and H1, respectively, from the areas AV over a period corresponding to a 30° rotation angle of the rotary head. Therefore, the synchronizing signal and the video signal are again disturbed considerably, and, in this case, as shown in FIG. 3, a noise bar b of a disturbed color picture in the lateral direction is produced in the lower portion of the reproduced picture and hence the AFC of the television receiver is greatly disturbed.

OBJECTS AND SUMMARY OF THE INVENTION

Accordingly, it is an object of this invention to provide an improved apparatus for recording and reproducing a video signal and an audio signal and which avoids the above-described problems encountered in the prior art.

It is another object of this invention to provide an apparatus for recording and reproducing a video signal and an audio signal, and in which, when a PCM audio signal is recorded in an after-recording mode, a noise from an audio signal recording section can be prevented from being mixed with a reproduced video signal so that a disturbed reproduced picture can be avoided.

It is a further object of this invention to provide an apparatus for recording and reproducing video and audio signals and which can remove noise caused when an audio signal recording area of a skewed track on a record tape is erased by an erase head before the recording in such area of a new PCM audio signal.

It is still a further object of this invention to provide an apparatus for recording and reproducing a video signal and an audio signal, as aforesaid, which is suitable for use in an 8 mm video tape recorder.

According to an aspect of the present invention, an apparatus for recording and reproducing color video and audio signals comprises first and second rotary heads for recording and reproducing the color video and audio signals in respective areas of alternate slant tracks on a record tape, playback circuit means for processing luminance and chrominance components separated from a color video signal reproduced by the rotary heads, audio circuit means for supplying an audio signal to be recorded to said rotary head's signal generating means for providing a predetermined signal that can be substituted for the processed luminance component, muting means for muting the processed chrominance component, and control means for causing said predetermined signal to be substituted for the processed luminance signal and said muting means to mute said processed chrominance component while the supplied audio signal is being recorded to replace a previously recorded audio signal.

In a particularly desirable apparatus according to the invention, switch means are controlled by the control means for alternately supplying the processed luminance component of the reproduced color video signal or the predetermined substitute signal which includes a synchronizing signal and a pedestal level signal. Further, an erase rotary head is provided at an intermediate position between the first and second rotary heads and is operated by said control means for erasing the previously recorded audio signal, at which time the control means also causes said switch means to supply said substitute signal and said muting means to mute the processed chrominance component.

The above, and other objects, features and advantages of the present invention, will become apparent from the following detailed description of a preferred embodiment taken in conjunction with the accompanying drawings, throughout which like reference numerals designate like elements and parts.

BRIEF DESCRIPTION OF THE DRAWINGS

FIGS. 5A to 5F are timing charts to which reference will be made in explaining the operation of the apparatus in FIG. 4.

DESCRIPTION OF THE PREFERRED EMBODIMENT

Figure 4:
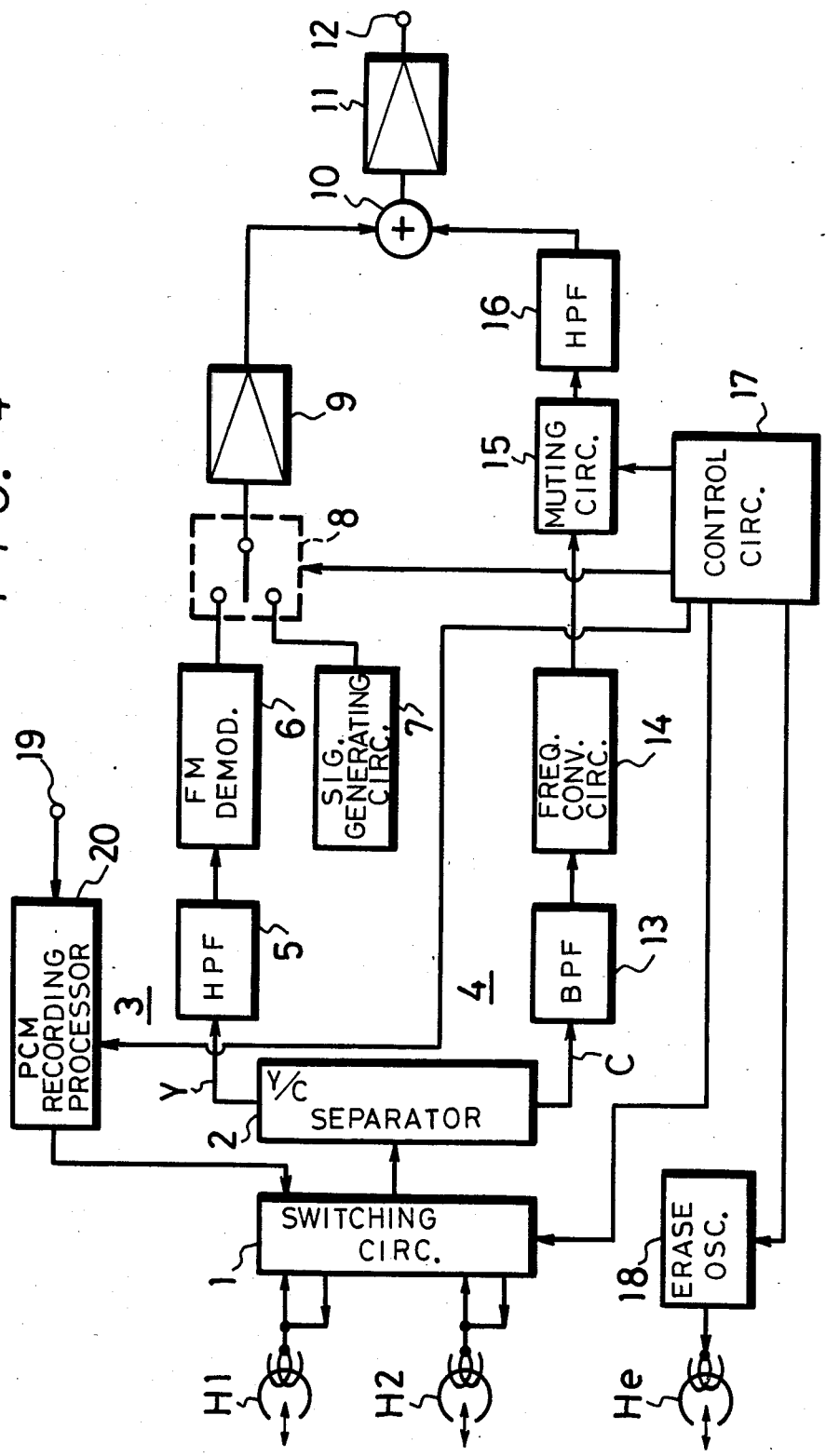
FIG. 4 is a block diagram showing one embodiment of an apparatus for recording and reproducing a video signal and an audio signal according to the present invention.

Referring now to FIG. 4, it will be seen that one embodiment of an apparatus for recording and reproducing a video signal and an audio signal according to the present invention is there shown applied to an 8 mm video tape recorder by way of example. In the 8 mm video tape recorder, two tape speeds or modes are available, that is, a standard play mode SP (having guard bands between the adjacent skewed tracks) and a long time play mode LP (without guard bands). In the embodiment being described, it is assumed that recording on the tape is being carried out in the SP mode.

Figure 1:
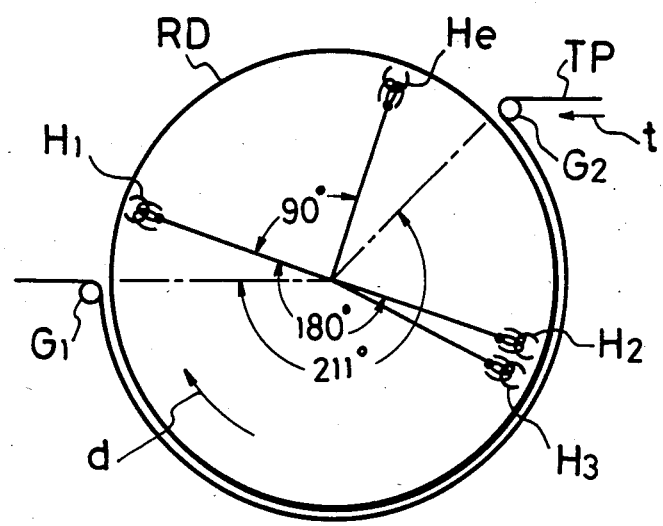
FIG. 1 is a schematic view showing a tape guide drum and head assembly, of an 8 mm video tape recorder to which this invention is desirably applied.
Figure 2:
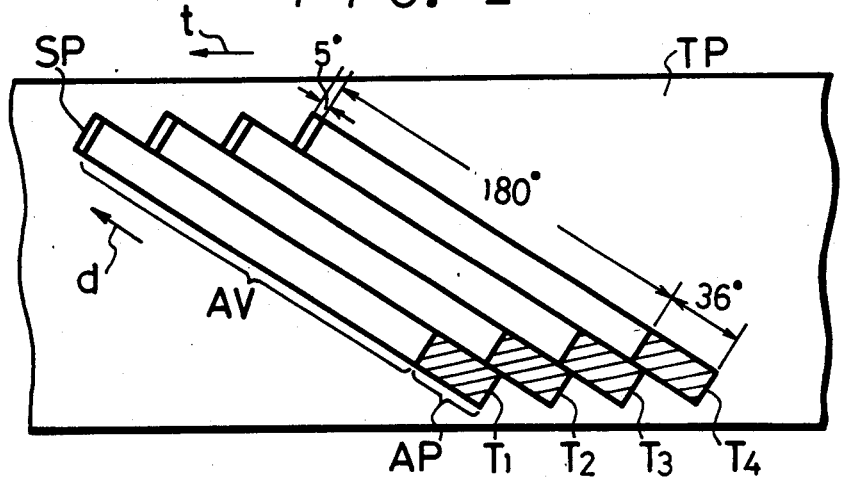
FIG. 2 is a schematic view showing a record track pattern on a tape used in the 8 mm video tape recorder shown in FIG. 1.

In the apparatus of FIG. 4, color video signals reproduced by first and second rotary heads H1 and H2 of FIG. 2 are supplied through a switching circuit 1 to a luminance/chrominance (Y/C) separating circuit 2. A recording circuit for the video signal and a playback circuit for the audio PCM signal connected to the first and second rotary heads H1 and H2 are omitted from the drawings and will not be described.

The luminance signal component from the luminance/chrominance signal separating circuit 2 is supplied to a luminance signal processing circuit 3, while the chrominance signal component is supplied from circuit 2 to a chrominance signal processing circuit 4.

In the luminance signal processing circuit 3, the luminance signal component from the luminance signal/chrominance signal separating circuit 2 is supplied through a high pass filter 5 to an FM demodulator 6 and thereby demodulated. A signal generating circuit 7 generates a substituted signal including a composite synchronizing signal and a signal defining a constant or pedestal level. The outputs from FM demodulator 6 and signal generating circuit 7, respectively, are selectively switched by a switch device 8 and then supplied through an amplifier 9 to a composer or adder 10.

In the chrominance signal processing circuit 4, the carrier chrominance signal component from the luminance/chrominance separating circuit 2 is supplied through a band pass filter 13 to a frequency converting circuit 14 in which it is reversely converted to the original carrier chrominance signal having a color subcarrier frequency of 3.58 MHz. The carrier chrominance signal from this frequency converting circuit 14 is supplied through a muting circuit 15 and a high pass filter 16 to the composer or adder 10 in which it is normally composed with the luminance signal component from amplifier 9 to thereby provide the original color video signal, for example, according to the NTSC system. This color video signal is delivered through an amplifier 11 to an output terminal 12.

A control circuit 17 is provided to control the above mentioned switching circuit 1, switch 8 and muting circuit 15. Control circuit 17 also controls the operation of an oscillator 18 for providing an erasing signal to head He, and of a PCM recording processor 20 which receives a new audio signal to be recorded from an input terminal 19.

Switch 8 is normally disposed to connect the output of FM demodulator 6 with amplifier 9, and muting circuit 15 is normally disposed in its non-muting state. During each period in which areas AP of two skewed tracks are erased by erase rotary head He using the signal from erase oscillator 18, and/or during each period when an audio signal applied to input terminal 19 is pulse-code-modulated and time-compressed by PCM recording processor 20 and supplied through switching circuit 1 to be recorded on the areas AP by first and second rotary heads H1 and H2, control circuit 17 operates to change-over switch 8 to its condition in which signal generating circuit 7 is connected to amplifier 9, and also to dispose muting circuit 15 in its muting state.

FIG. 5A shows a switching pulse for the heads H1 and H2 in which "H" (high level) represents an interval in which the first rotary head H1 scans an area AV of a respective track and "L" (low level) represents an interval in which the second rotary head H2 scans an area AV of another track. FIGS. 5B and 5C respectively illustrate output signals from the first and second rotary heads H1 and H2. When recording is carried out in the after-recording mode, during scanning of the area AP for continuing the PCM audio signal, the head H1 or H2 is placed in the recording mode, whereas, during the scanning of the area AV continuing the recorded video signal, the head H1 or H2 is placed in the reproducing mode. FIG. 5D shows the periods in which the erase head He is made operative by the output of oscillator 18. Since the erase head He erases the areas AP of two tracks simultaneously, head He is operated in only every other field. FIG. 5E shows the periods in which the new PCM audio signal is recorded by heads H1 and H2. Hence, FIG. 5F shows the periods in which noise appears on the picture due to the PCM audio signal being recorded and due to the erase head being operated.

Figure 3:
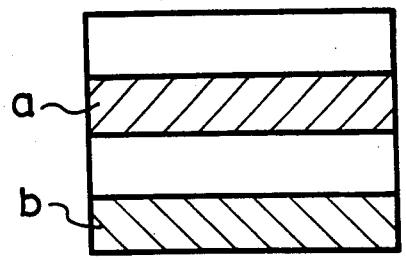
FIG. 3 is a schematic representation of a reproduced picture illustrating problems to be overcome by the invention.

Thus, when the switch 8 is positioned to connect the signal generating circuit 7 with amplifier 9, the synchronizing signal and video signal disturbed by the erasing current and by a new PCM signal to be recorded are respectively replaced by a dummy synchronizing signal and by the signal having the pedestal level as generated by circuit 7. Accordingly, the areas of the laterally extending noise bars a and b on FIG. 3 become black bars. As a result, the noises are masked and, at the same time, the disturbance of the synchronizing signal is removed and interference with the AFC (automatic frequency control) of the television receiver is prevented.

Furthermore, it is possible to avoid the occurrence of color noise, such as, color flicker and the like produced in the areas a and b (in FIG. 3), by establishing the muting state of muting circuit 15.

In the above-described embodiments of the invention, it has been assumed that the video signal and the audio signal are recorded on the tape in the SP or standard play mode. If the video and audio signals are recorded on the tape in the LP or long play mode, no guard band is formed between the recorded tracks. So, even if the PCM audio signal is overwritten, there is no possibility that any area will remain unerased. Thus, the erase rotary head may not be needed for the after-recording mode. In that case, although a noise bar caused by the erase rotary head is not produced, a noise bar may still be caused by the PCM recording signal mixing with the reproduced video signal. Hence, the present invention can be similarly applied to such case with the same effect being achieved.

By way of summary, it is to be noted that, according to the present invention as set forth above, in an apparatus for recording and reproducing a video signal and an audio signal and in which the video signal recorded in video signal recording areas of adjacent skewed tracks on the tape is reproduced by first and second rotary heads, respectively, and, after audio signal areas on the adjacent skewed tracks are erased by an erase rotary head, a new PCM audio signal is recorded in such audio signal areas by the first and second rotary heads, it is possible to prevent noise from being mixed with the reproduced video signal when the audio signal recording area of the skewed track is erased and/or the new PCM signal is recorded.

Although a single preferred embodiment of the invention has been described above with reference to the accompanying drawings, it is to be noted that the invention is not limited to that precise embodiment, and that many modifications and variations can be effected therein by one skilled in the art without departing from the spirit or scope of the invention as defined in the appended claims.

What is claimed is:

1. An apparatus for recording and reproducing a color video signal and an audio signal in respective areas of successive slant tracks on a record tape, said apparatus comprising:

first and second rotary heads attached to a rotary drum for recording and reproducing said color video and audio signals in alternate slant tracks on the tape wrapped about said drum; playback circuit means for processing luminance and chrominance components of said color video signal reproduced by said first and second rotary heads; audio circuit means for supplying an audio signal to said rotary heads to be recorded; signal generator means for generating a predetermined substitute signal; muting means for muting the processed chrominance component; and control means for replacing said processed luminance component by said substitute signal from said signal generator means and for operating said muting means to mute said processed chrominance component while said audio signal is recorded to replace a previously recorded audio signal.

2. The apparatus according to claim 1, wherein said tape is wrapped around said rotary drum with an angle of more than 180° and said audio signal is a digital signal.

3. The apparatus according to claim 2, further comprising an erase rotary head on said rotary drum for erasing said recorded audio signal.

4. The apparatus according to claim 3, wherein said control means further causes the replacement of said processed luminance component by said substitute signal and the muting of said chrominance component while said previously recorded audio signal is erased by said erase rotary head.

5. The apparatus according to claim 1, wherein said substitute signal includes a synchronizing signal and a signal having a constant level.

6. The apparatus according to claim 5, wherein said constant level is a pedestal level.

7. In an apparatus including first and second rotary heads which are diametrically opposed to be operative alternately for recording and reproducing a color video signal and an audio signal in respective areas of successive slant tracks on a record tape and a rotary erase head intermediate said first and second heads and operative to simultaneously erase signals in an adjacent two of said tracks, said apparatus having an after-recording mode in which said erase head is made operative to erase an audio signal from the respective areas of an adjacent two of said tracks and then a new audio signal is supplied to said first and second heads for recording in said respective areas of said two adjacent tracks; said apparatus further comprising:

playback circuit means for separately processing luminance and chrominance components of a color video signal reproduced from the respective areas of said slant tracks by said first and second heads;

signal generator means for generating a substitute signal containing synchronizing and pedestal level signals;

switch means normally selecting, as its output, said luminance component from said playback circuit means and being changed-over to select said substitute signal as; said output in place of said luminance component;

muting means receiving said chrominance component from the playback circuit means and being operative to mute the chrominance component;

composing means receiving said output of the switch means and the chrominance component from said muting means to provide a composite video signal for display; and control means operative in said after-recording mode of the apparatus to change-over said switch means for selecting said substitute signal and to operate said muting means for muting the chrominance component during each of the intervals when said erase head is made operative to erase an audio signal from the respective areas of said two adjacent tracks and when said new audio signal is being recorded by said first and second heads, respectively.

* * * * *